United States Patent [19]

Anderson et al.

[11] Patent Number: 6,047,356
[45] Date of Patent: Apr. 4, 2000

[54] METHOD OF DYNAMICALLY ALLOCATING NETWORK NODE MEMORY'S PARTITIONS FOR CACHING DISTRIBUTED FILES

[75] Inventors: David P. Anderson, Berkeley; James A. Moorer, San Rafael, both of Calif.

[73] Assignee: Sonic Solutions, Novato, Calif.

[21] Appl. No.: 08/229,041

[22] Filed: Apr. 18, 1994

[51] Int. Cl.[7] .................................................. G06F 12/08
[52] U.S. Cl. ................ 711/129; 711/113; 711/118; 711/137; 711/171; 711/173; 711/153; 711/168; 707/104; 707/205; 709/203; 709/214; 709/215; 709/216; 709/217; 709/218; 709/219; 709/234; 710/52; 710/56; 710/60
[58] Field of Search .................................... 711/113, 117, 711/118, 129, 137, 173, 170, 171, 172, 153, 168; 707/104, 205; 709/203, 214, 215, 216, 217, 218, 219, 234; 710/52, 56, 60

[56] References Cited

U.S. PATENT DOCUMENTS

| | | | |
|---|---|---|---|
| 4,882,642 | 11/1989 | Taylor et al. ........................ | 360/78.11 |
| 4,887,204 | 12/1989 | Johnson et al. .......................... | 707/8 |
| 4,897,781 | 1/1990 | Chang et al. .......................... | 707/201 |
| 4,956,803 | 9/1990 | Tayler et al. .......................... | 711/113 |
| 5,163,131 | 11/1992 | Raw ...................................... | 709/202 |
| 5,357,623 | 10/1994 | Megory-Cohen ..................... | 711/129 |
| 5,381,528 | 1/1995 | Brunelle ................................ | 710/56 |
| 5,381,539 | 1/1995 | Yanai et al. ........................... | 711/133 |
| 5,390,318 | 2/1995 | Ramakrishnan et al. ............. | 711/129 |
| 5,394,531 | 2/1995 | Smith ..................................... | 711/136 |

OTHER PUBLICATIONS

M. Seltzer et al., "Disk Scheduling Revisited," Proceedings 1990 *Winter USENIX*, pp. 313–324.

T.S. Bowen, "Software update speeds NFS write process on server," *Digital Review*, vol. 7, No. 30, p. 17, Aug. 6, 1990.

C. Ruemmer et al., "UNIX disk access patterns," Proceedings *1993 Winter USENIX*, pp. 405–420, Jan. 1993.

S. Sivaprakasam, "Performance Enhancements in SunOS NFS," *Technical Report TR 93–18,* State University of New York, Buffalo Computer Science Dept., May, 1993.

C. Juszczak, "Improving the Write Performance of an NFS Server," Proceedings *1994 Winter USENIX*, pp. 247–259, Jan. 1994.

*Primary Examiner*—Hiep T. Nguyen
*Attorney, Agent, or Firm*—Townsend and Townsend and Crew LLP; Kenneth R. Allen

[57] ABSTRACT

A distributed file system with dedicated nodes capable of being connected to workstations at their bus. The system uses a complementary client-side and server-side file caching method that increases parallelism by issuing multiple server requests to keep the hardware devices busy simultaneously. Most of the node memory is used for file caching and input/output (I/O) device buffering using dynamic memory organization, reservation and allocation methods for competing memory-intensive activities.

5 Claims, 11 Drawing Sheets

METHOD OF DYNAMICALLY ALLOCATING NETWORK NODE MEMORY'S PARTITIONS FOR CACHING DISTRIBUTED FILES

BACKGROUND OF THE INVENTION

The present invention relates generally to distributed file systems, and more particularly to distributed file systems optimized for time-critical sequential access to large files.

Distributed file systems include network nodes, which are computer systems attached directly to a network. Each network node has a processor, random-access memory (RAM), and an interface to a communication network. Nodes that are able to act as "servers" are interfaced to mass storage devices such as disk drives. The mass storage devices are usually partitioned in allocation units and data is read from or written to the device in multiples of sectors up to one allocation unit. In an access to a file on a given disk, the network node where the disk is located is called the "server" and the node from which the request was issued is called the "client." In a read access, data flows from the server to the client; in a write access, data flows from the client to the server. A single node may act as both client and server, and may run concurrent tasks. While one task waits, for example, for required data, other tasks can execute.

Because disk access is orders of magnitude slower than RAM access, large chunks of data may be read from the disk to RAM memory under the assumption that portions of, or near to, the data presently accessed have a high likelihood of being accessed in the near future. This is termed "caching." Caching may also be used with data to be written to the disk, to avoid the first disk access if the same data is later overwritten. A unit of cache data is said to be "dirty" if it has been modified in RAM memory, and therefore the corresponding data on disk must eventually be modified. The present invention uses read-ahead and write-behind caching techniques for sequential rather than repetitive file access, which attempt to separate the disk or network access from the read or write steps of application programs in order to lessen the need for waiting by the application program. In read ahead, future file read access by an application is predicted and the data is read into the cache before being requested by the application. In write behind, data to be written is placed into a cache and, after the application program resumes execution, written to the disk.

As distributed computing in multimedia, video, and audio data processing becomes widespread, the low speed of multi-megabyte file access over local area networks (LANs) becomes a significant problem. Even when high-speed networks, such as fiber distributed data interface (FDDI) token rings with data rates of 100 megabit per second (Mbps) are used, the combined latency (file access delay) due to client- and server-node task scheduling, their network-adapter data-transfer rates, the server disk latency and the network latency, has heretofore diminished the practicality of LANs for such data processing. For example, the throughput of Appletalk networks may be as low as 0.3 megabytes per second, and the throughput of Sun NFS (network file server) may be as low as 1 megabyte per second. To supply, in real time, sixteen sound channels requires a throughput of almost 2 megabytes per second.

As a result of this difficulty, a number of professional digital audio workstation manufacturers support the use of storage devices that are removable from fixed drives (removable media), such as disks based on magneto-optic (MO) technology for file transfers between workstations. This technology has been deemed necessary even though MO disk drives cost more than hard disk drives of comparable storage and have slower access times. Therefore, local hard disks are still used as the "workspace" for holding the data that is being worked with.

If a network rather than removable media is used for file transfers, multiple operators may work on different parts of the same project at the same time and concurrent access of multiple files is possible from each workstation or host computer. Accordingly, a primary object of the present invention is to provide a cooperative client-side and server-side file caching method that maximizes the end-to-end throughput of sequential file read and write access.

Another object of the present invention is to provide dynamic memory organization, reservation and allocation methods for competing memory-intensive activities.

A further object of the present invention is to provide a distributed file system with dedicated nodes capable of being connected to a workstation's memory bus and providing file server and client-side caching functions independent of the workstation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the claims.

SUMMARY OF THE INVENTION

The present invention is directed to a distributed file system. At least one node of the system operates as a server providing network access to files on a local disk, and at the same time operates as a client on behalf of a host computer to which it is attached via a bus interface.

A memory organization method of the present invention includes partitioning mass storage device cache and I/O device buffer memory into a plurality of memory units of equal size. A plurality of sets of the units are dynamically assigned to mass storage device caches and I/O device buffers, independent of the order and distribution of the units in physical memory. A data structure of remaining unused units is maintained independent of the order and distribution of the unused units in physical memory. The sets of memory units are used as mass storage device caches and I/O buffers. The assignment of at least one unit is changed from one set to a second set.

A memory reservation method of the present invention includes specifying a minimum and a maximum amount of memory to be reserved for an activity. If enough memory is available, an amount of memory between the minimum and the maximum is reserved for the activity. For each activity for which memory has been reserved, the amount of memory reserved is dynamically adjusted between the minimum and the maximum such that the sum of all reservations is less than or equal to the memory available.

A method for file read caching of the present invention on the client or server side includes verifying that the cache blocks are a range of blocks contiguous in the file and beginning with the required cache block, and, if the full range of blocks are not in the cache, reading the missing blocks into the cache. The read request may be served before or after any missing blocks are read into the cache depending on whether the requested data is initially available in cache.

A method of the present invention for mounting of mass storage devices includes periodically testing to determine what mass storage devices are connected to a node. After physically connecting mass storage devices to the node, the presence of the mass storage devices is detected, and at least one process is started for each device, dedicated to said mass storage device for serving file access requests to the device.

A method for disk file write caching of the present invention includes determining whether the data is to be written in a cache block at the end of a mass storage device allocation unit. In such a case, the cache block and all other dirty contiguous cache blocks in the same mass storage device allocation unit are written to the mass storage device. Otherwise, the data is written to the cache only.

A method of the present invention for caching file-access using a limited amount of memory includes providing one cache for each file that is being accessed. The present or future rate of file data access through each said cache is estimated. Memory is allocated to each cache in an amount dependent on the estimated rate of data flow.

A method of the present invention for caching file reads by a client from a network file server includes providing caches on both the server and the client, the server cache reading the data in mass storage device allocation units, remainders of files, or whole caches, whichever is less, and the client cache storing the data in multiples of cache blocks. Sufficient cache blocks are read ahead into the client cache to keep the server cache one mass storage device access ahead of the data currently read by the client application.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

DESCRIPTION OF THE PREFERRED EMBODIMENT

Figure 1:
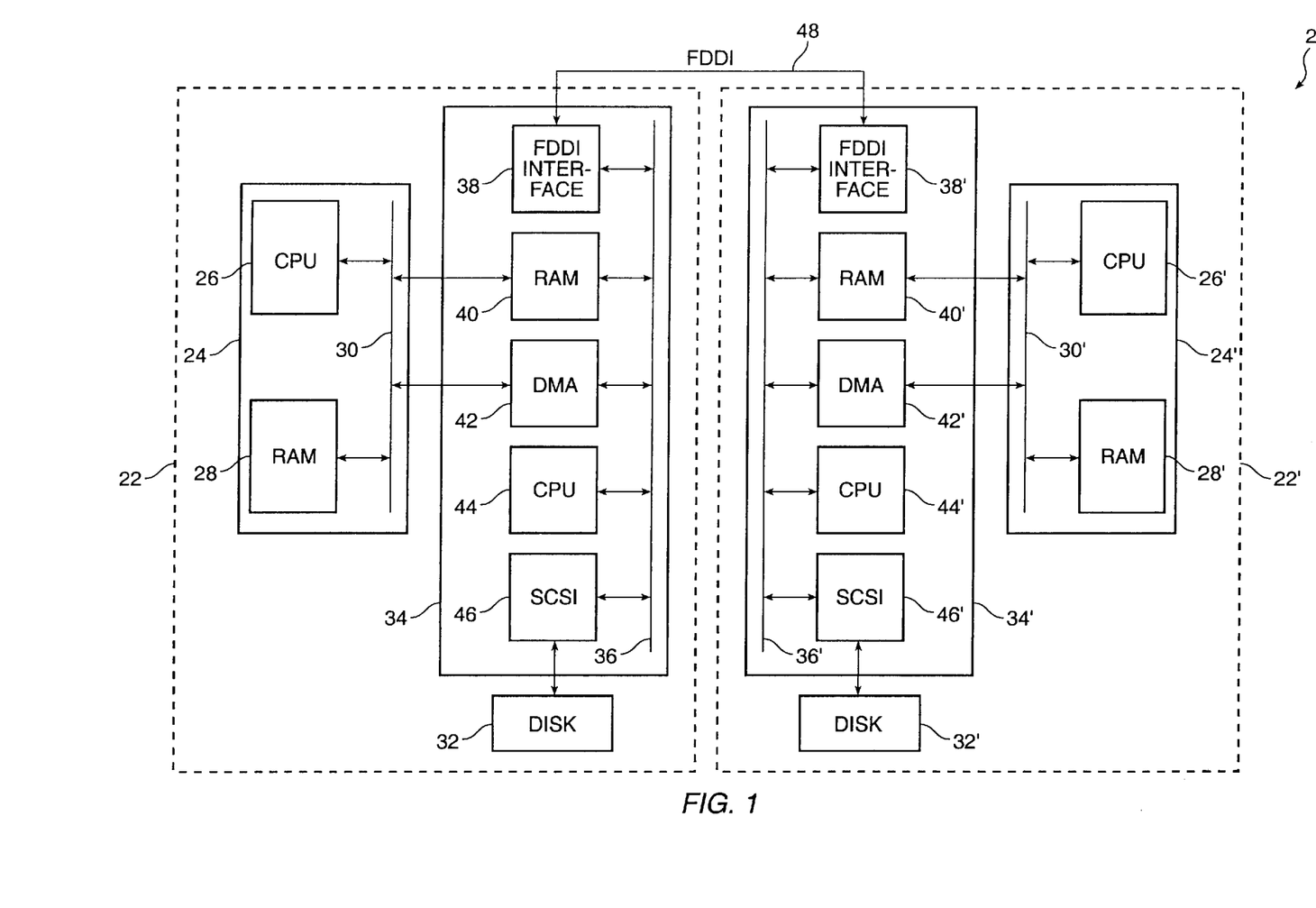
FIG. 1 is a schematic block diagram of a distributed file system according to the present invention.

The present invention will be described in terms of the preferred embodiment. The preferred embodiment is an apparatus and method for high speed file access with a distributed file system. Such a system 20 is shown in FIG. 1.

System 20 includes two or more subsystems 22 and 22' connected by a network 48. Subsystems 22 and 22' are identical so that only subsystem 22 will be described, with the understanding that an analogous description applies to subsystem 22'.

Subsystem 22 includes a host computer 24 with bus 30, a network node 34 connected to bus 30 and possibly peripherals such as disk 32. Host computer 24 may be an Apple Macintosh computer having a Motorola 68040 microprocessor as a CPU 26 and 64 megabytes of RAM 28. Node 34 may be a NuBus bus-compatible card having a Motorola 68030 microprocessor as a CPU 44 and 4 megabytes of RAM 40. Bus 36 of the node is connected to bus 30 of the host via direct memory access (DMA) hardware 12 capable of DMA between RAM 28 and RAM 40 in either direction. This is the main means of data transfer between host 24 and node 34. Node 34 also has access to the disk 32 via small computer system interface (SCSI) 46 and communicates with node 34' of the second subsystem 22' via FDDI network 48 to which it is connected with interface 38. Disk 32 and SCSI interface 46 may be missing, in which case node 34 could work only as a client and not also as a server.

Node 34 is the server for access to files on disk 32, and the client for remote file accesses, i.e. access to files outside of subsystem 22 requested by host 24. In the preferred embodiment, host 24 an Apple Macintosh computer that is not multitasking, so there will always be at most one request from it for remote file access pending at any given time. Thus in this preferred embodiment there is only one task running on node 34 for handling requests from host 24. The present invention, however, is not limited to non-concurrent requests from the host, and the teaching herein is sufficient to allow one skilled in the art to practice it with multitasking hosts. In order to run concurrently as client and server, or to serve multiple requests concurrently, nodes 34 and 34' may run a multitasking operating system such as Psos. It should also be noted that the present invention is not limited to nodes that are contained within host computers. For example, the nodes could be self-contained computers.

Node 34 receives a sequence of client file access requests from host 24. The requests could also originate from the node itself without departing from the scope of the present invention. The types of requests include: 1) open a particular local or remote file; 2) read a range of bytes from an open local or remote file into a memory cache in the node; 3) write a range of bytes from a local-node memory buffer to an open local or remote file, 4) close an open local or remote file and 5) to flush a cache by writing dirty blocks to the disk. The server activities of the nodes maintain as little state information as possible, for instance, by serving read and write requests without designating files as open or closed.

Some of the node RAM 40 holds executable code, stacks and heaps for the programs executed by the node. To allow communication between CPUs 26 and 44, part of RAM 40 is also mapped into the address space of CPU 26, using bus 30. However, because the node 34 is dedicated to network and file access functions, most of the memory is used for temporary storage of data being transferred: buffers for incoming and outgoing network packets, caches of file data for both the client and server sides, and caches of file system index structures (disk allocation maps, directories, etc.). Each use of memory has a natural allocation unit: network packets may be about 4 kilobytes (kB), and disk cache units may be 64 kB or larger. The memory available for temporary storage of data (i.e., memory not used for storing executable code, fixed variables, etc.) will be called "buffer memory."

To allow memory to be dynamically assigned to any of these uses, the system divides buffer memory in blocks that are preferably of equal size, for example 4 kB. Each block is called a "buffer"; the entire set is called the "buffer pool." To allow structures larger than 4 kB. the system uses a data structure such as an array of pointers to 4 kB buffers, together with functions that map offsets in the buffers to physical addresses. Device drivers (functions to read and write data to I/O devices) are written to handle buffers in this form using DMA without copying data from buffer to buffer in RAM 40. This scheme allows most physical memory to be used for any purpose, without memory fragmentation, and without virtual-memory hardware.

Figure 2:
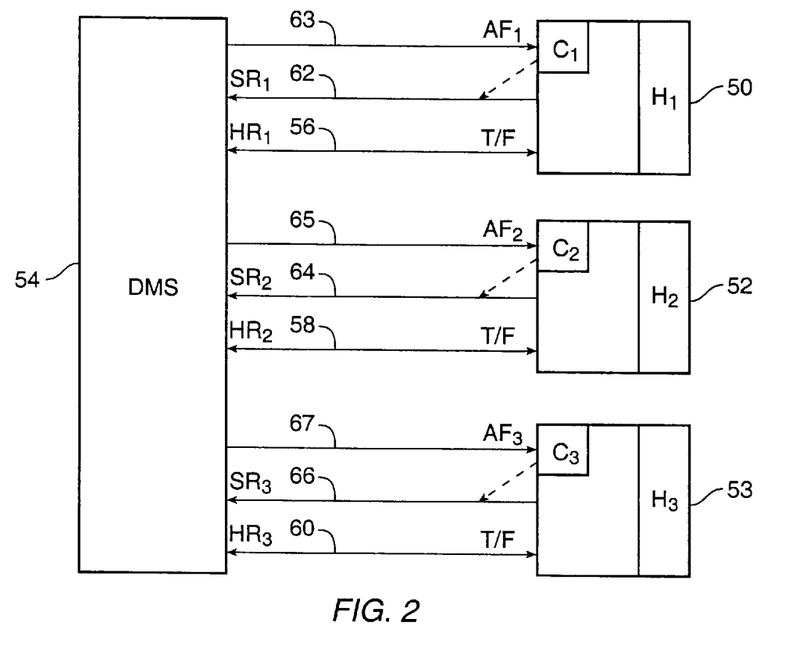
FIG. 2 is a schematic block diagram of a buffer memory reservation system according to the present invention.
Figure 3:
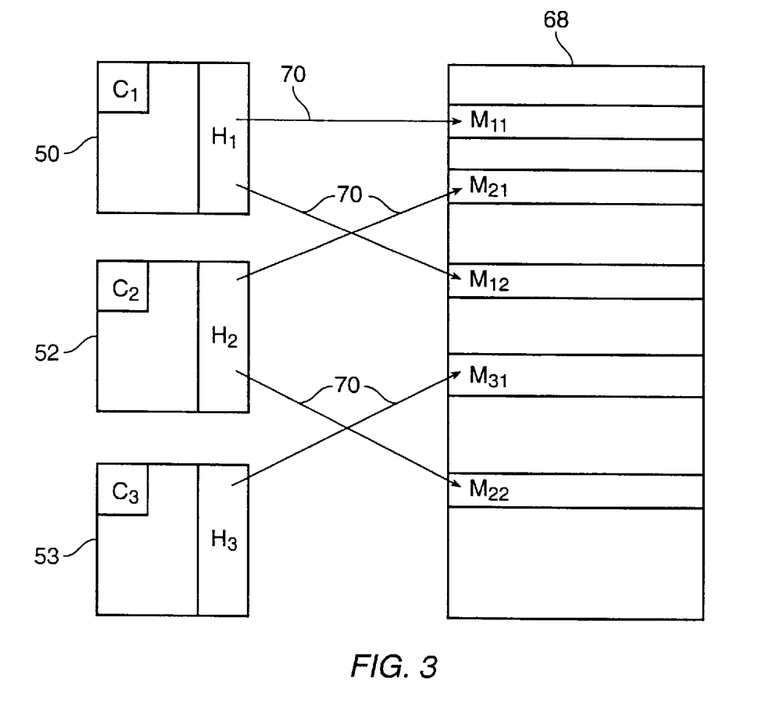
FIG. 3 is a schematic block diagram of allocation of memory reserved using the system of FIG. 2.

As shown schematically in FIGS. 2 and 3, the nodes of the present invention use a novel technique termed dynamic memory scheduling or DMS 54 for managing the buffer pool in RAM 40. The blocks in FIGS. 2 and 3 are software or data entities. They are held in RAM 40, and the executable portions are executed by CPU 44. In FIG. 2 the arrows are function calls, and in FIG. 3 the arrows are pointers. DMS 54 serves to divide a node's memory between a set of competing "activities". Any distinct uses of memory can be designated as a distinct activity, independent of whether the activity is implemented using one or more tasks, functions or objects, and independent of whether two activities are implemented using the same or separate tasks, functions or objects. For example, in the preferred embodiment there are two activities, client caching and file service, as discussed in greater detail below, and a third activity, network traffic other than file service, which requires a constant small amount of memory and will not be described. In the example of FIGS. 2 and 3, there are three activities 50, 52 and 53. The DMS 54 has separate notions of "reservation" and "allocation." An activity can reserve some number of buffers; this does not allocate specific buffers, but ensures that a subsequent allocation request will succeed. In FIG. 2, the DMS 54 arbitrates conflicting memory reservations by activities 50, 52 and 53.

The DMS 54 provides two types of memory reservation. An activity makes a "hard" reservation for its minimal memory requirement. A hard reservation request specifies a number of buffers, and either succeeds or fails. In FIG. 2, arrows 56, 58 and 60 represent hard reservation interactions, with requests $HR_1$, $HR_2$ and $HR_3$ transmitted from the activities 50, 52 and 53 to DMS 54 and true or false (T/F) responses from the DMS 54 conveying the outcome to the activities. In addition, an activity can make a "soft" reservation request, in which it specifies the maximum number of buffers it can use, represented by arrows 62, 64 and 66 in FIG. 2, with the maximum numbers of buffers being $SR_1$, $SR_2$ and $SR_3$, respectively. Furthermore, as shown by the broken arrows in FIG. 2, the activity must supply or register the address of a callback function ($C_1$, $C_2$ and $C_3$ in FIG. 2), that is to be called by DMS 54 whenever the soft reservation changes. DMS 54 returns the actual number of buffers available to the activity, $AF_1$, $AF_2$ and $AF_3$ by calling callback functions $C_1$, $C_2$ and $C_3$ as indicated by arrows 63, 65 and 67. If the soft reservation has decreased, this callback function must free buffers accordingly. If the soft reservation has increased, the function can initiate actions to use the newly-available buffers. As shown in FIG. 3, portions $M_{11}$ and $M_{12}$, $M_{21}$ and $M_{22}$, and $M_{31}$ of the buffer pool 68 in RAM 40 may be allocated to activities 50, 52 and 53, respectively. The activities maintain the information of which buffers they control using data structures allocated on the heap ($H_1$, $H_2$ and $H_3$ in FIGS. 2 and 3), such as the arrays of pointers mentioned above. The free buffers or their locations may be stored as a linked list.

Figure 4:
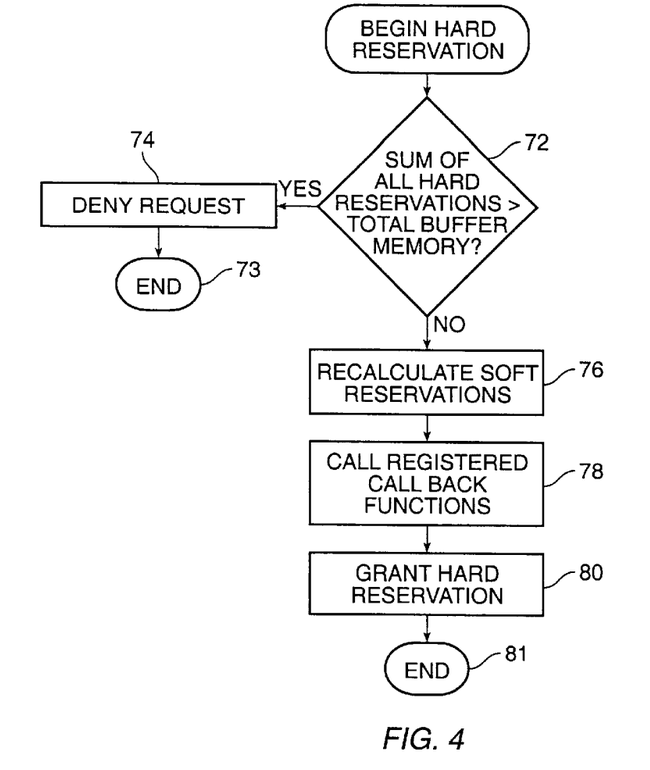
FIG. 4 is a flow chart of the processing of a hard memory reservation request.
Figure 5:
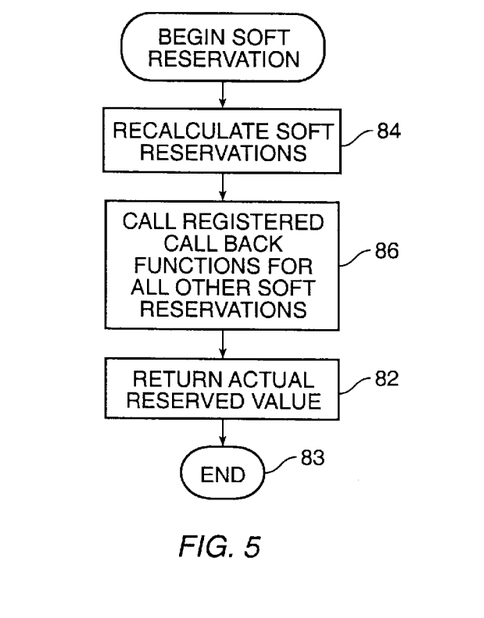
FIG. 5 is a flow chart of the processing of a soft memory reservation request.

The DMS module uses a policy for dividing the buffer pool, less hard reservations, among the soft reservation requests (boxes 76 and 84, FIGS. 4 and 5). The policy in the preferred embodiment is that each activity receives 1/n of the available buffers rounded down to the nearest integer, or its request, whichever is less, where n is the number of activities. The remainder is divided arbitrarily, without dividing any of the buffers. Other policies are also possible. For example, the soft reservation for an activity could be kept proportional to the recent data rate (bytes per second) of file access handled by that activity.

FIG. 4 is a flow chart of the handling of hard reservation requests, to be executed by CPU 44. The DMS 54 gives each hard request 56, 58 and 60 priority over all soft requests, so a particular hard request is not granted only when the sum of all hard reservations would become greater than the total buffer memory portion of RAM 40, as indicated by boxes 72, 73 and 74. Clearly, this would not happen if an existing hard reservation is being reduced or canceled. Since the amount of buffer memory available for soft reservations is changed by the granting of a hard reservation, the actual soft reservations are recalculated using the predetermined policy for division of the memory discussed above, as indicated by box 76. The new soft reservations are put into effect by calling each of the reservations' callback functions in turn, as indicated by box 78. After the callback functions $C_n$ have been called, any needed memory has been freed, and the hard reservation is granted as indicated by block 80. The hard reservation algorithm ends here as indicated by box 81.

When a soft reservation is requested or changed, the amount of memory available for soft reservations does not change, but the distribution of soft reservations is reevaluated by the DMS 54 executed by CPU 44 in view of the new soft reservation, as indicated by box 84 in FIG. 5. To ensure that there is memory available for the new soft reservation, the callback functions $C_n$ for the preexisting soft reservations are each called in turn such that memory is released by the other activities if necessary (box 86). The actual reserved amount of memory may then be returned by calling the registered callback function as indicated by box 82. The soft reservation algorithm ends here as indicated by box 83.

At any given time, several tasks may be executed concurrently on each node by CPU 44. A client-handler task receives and handles host requests for file access one at a time. When not handling a host request, this task goes to sleep until the host makes a new request for file access. At that point, an interrupt handler sends an event to the client handler task, which proceeds to handle the new request. An event wakes up a process if it is sleeping. For every mass storage device connected to the node, two server tasks (see FIG. 9) run concurrently, each task being capable of handling remote requests for access to the device. These requests are provided by a network interrupt handler, which also provides the client handler task with data it requested from other nodes. A custodian process (see FIG. 12) performs periodical housekeeping functions at regular time intervals. An Appletalk handler task, not described, is also running. The Appletalk protocol is described in *Inside Appletalk*, Second Ed., by Sidhu Gursharan, Richard Andrews and Allan Oppenheimer, Addison Wesley, Menlo Park, Calif., 1990, incorporated herein by reference. The above processes are all executed by CPU 44.

Host 24 makes requests to its node 34 by writing data into the shared portion of RAM 40 and then interrupting the CPU 44. CPU 44 then runs a host request interrupt handler (not shown) that issues events to the client handler task. After issuing a request, host 24 waits until it receives a host reply from node 34. The host reply is given by modifying data in the shared portion of RAM 40. The waiting of host 24 is acceptable in the preferred embodiment because host 24 is not a multitasking system. If host 24 were multitasking, the process issuing the host request would then sleep, and the node would give the host reply by interrupting CPU 26 of host 24, to signal that the process that issued the host request may be woken up.

Figure 6:
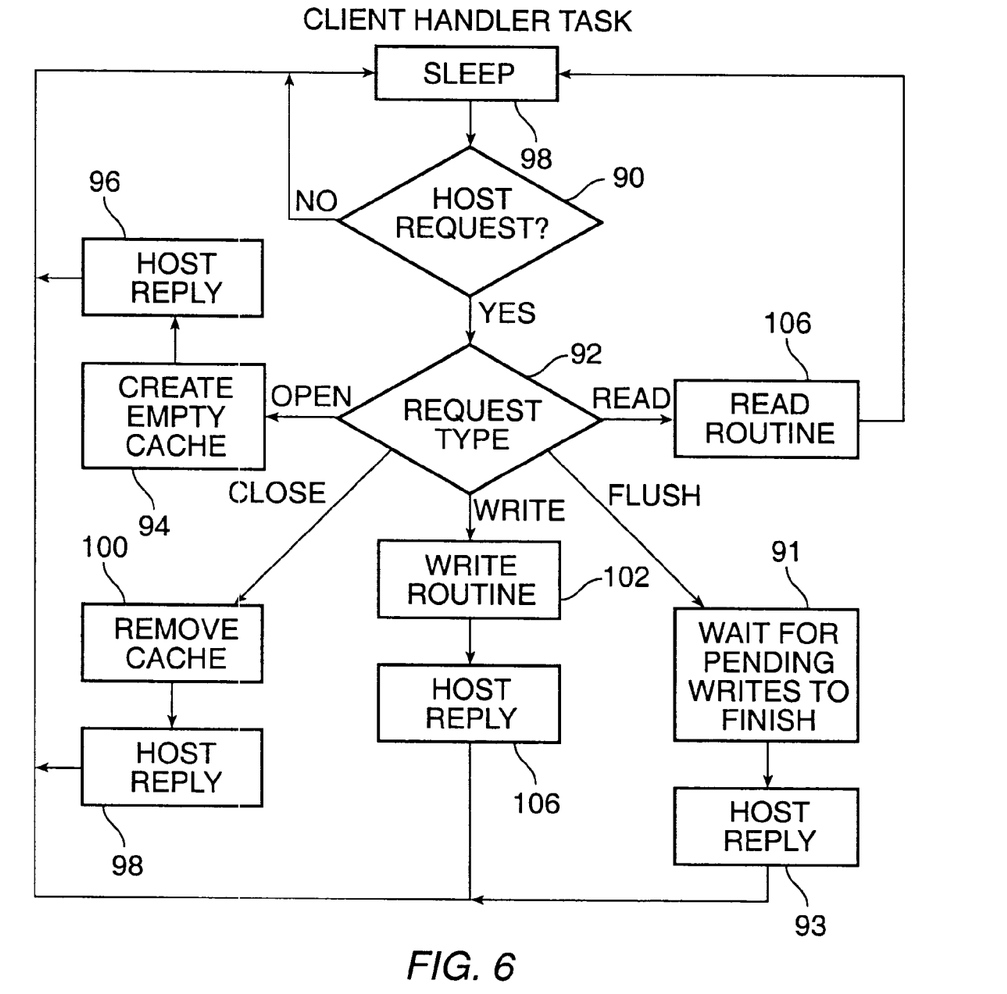
FIG. 6 is a flow chart of a client handler task according to the present invention.

FIG. 6 is a simplified flow chart of the client handler task. As mentioned above, this task goes to sleep after serving a host request, as indicated by box 88. As indicated by box 90, the task goes back to sleep if it receives an event other than a host request. There are five types of host requests in the preferred embodiment of the present invention. There are also additional requests for the Apple name binding protocol which is well known and with which the preferred embodiment of the present invention is compatible, but which are not shown in FIG. 6. The five requests are open, close, read, write and flush, and are handled by five branches starting at the request identification stage 92. The way these requests are handled will be described after the client caches are described.

The client handler task maintains a "client cache" in RAM 40 for each open file. Each client cache stores a contiguous range of data from that file. Each cache is divided into non-overlapping "client cache" blocks. These blocks are typically of a constant size, but need not be. Each client cache is in one of the following four states: empty, read, read-ahead, and write. Each client cache has an "ideal size" (depending only on its state), a "maximum size" (depending on the memory management decisions) and an "actual size" (the number of cache blocks in memory).

The client handler task running on node 34 makes requests to read or write client cache blocks for various files, possibly on other nodes over the network. These are called "server requests." Such a request initiates a read or write activity involving network communication for remote disks, and disk I/O operations for local disks. As mentioned earlier, there are no server requests for opening and closing files. The network address of the server and the disk are obtained by the requesting host, using the above-mentioned name binding protocol. Similar protocols exist for other networks such as Sun NFS. The server requests are "asynchronous", i.e., they start an activity, but do not wait for it to finish. At some future point a task can check if the operation is completed, wait for it to finish, or (for read operations) cancel it. Cancelling an operation frees any buffers already used, and causes subsequent network packets for that operation to be discarded on arrival.

In the empty state, a client cache contains no data. Its ideal, maximum and actual sizes are zero. A client cache is in this state initially, and whenever memory allocation has reduced its allocated size to zero.

A client cache is in the read state when the last operation on the file was a read, but a sequential read pattern has not been detected. A sequential pattern exists when the client reads or writes starting from some point in the file, and proceeding towards the end of the file without skipping any blocks. Since no reading ahead is being done, the cache contains a single block, the one containing the last byte read. The ideal, allocated and actual sizes are all one.

When the last operation was a read and a sequential read pattern has been detected, the client cache is in the read-ahead state. The cache contains a contiguous range of file data. Asynchronous "read-ahead" requests are issued for all blocks in the client cache not yet retrieved from the server to maximize performance by increasing parallelism. The goal is to keep all the hardware devices involved (disk, busses, network links, etc.) busy simultaneously. For a given open file, the optimal number N of parallel requests depends on the client cache block size X, the disk allocation unit size Y, the average network latency Z, and the network bandwidth B. If X<Y and Z is small, then we use N=(Y/X)+1. If Z is significant, then we use the more general formula N=(Y/X)+(ZB/X)+1. In this way, when a disk read completes at the server, there are Y/X requests eat the server to handle the data in that allocation unit, and an additional request that will immediately initiate another disk I/O. Thus the ideal size of a read-ahead cache is N as defined above. The maximum arid actual sizes depend on memory allocation.

The client cache is in the write state when the last operation was a write. The cache contains a contiguous range of file data, the last block of which is the block to which the last byte was written. The blocks have asynchronous write operations pending or have already been written to the server. The ideal size is N as defined above.

Client cache sizes are determined as follows. One soft reservation is made, equal to the sum of the ideal size is of all client caches. When the soft reservation is fully granted, the actual size of each client cache is its ideal size. If, however, the soft reservation request is not fully granted, the memory is divided among client caches in proportion to the predicted data rate of client access to each open file. This rate may be calculated periodically by the custodian task running on the node and described in greater detail below. In the preferred embodiment, this rate is computed as an exponentially weighted average of the number of bytes transferred in fixed periods of time. This average is calculated by adding one-half the previous average and one-half the number of bytes transferred during the latest time period. Other prediction techniques are possible without departing from the scope of the present invention.

Figure 13:
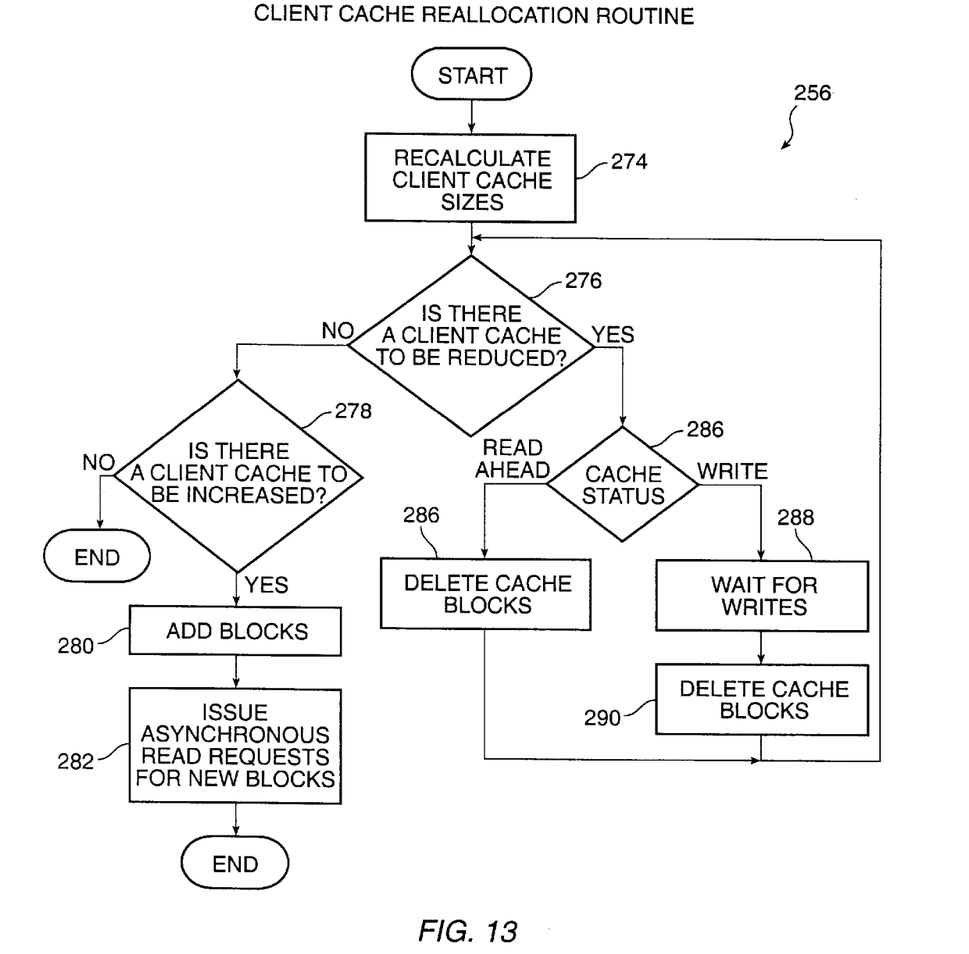
FIG. 13 is a flow chart of a client cache reallocation routine according to the present invention.

When the soft reservation for the client caches has changed, when a client cache has been created or deleted, when data rates have changed, or when a new device has been added or removed, the cache sizes must be adjusted by the node 34 as shown in the flow chart of FIG. 13. First, sizes to be allocated are calculated in proportion to the predicted data-transfer rates (box 274). However, before any caches can be increased or created, memory must be freed by reducing the sizes of the caches whose rates have decreased and deleting any caches for files that have been closed. One such cache is identified (box 276) and the status of the cache is then determined (box 284). If the cache is in the read-ahead state, the requests for blocks at the end of the cache are simply cancelled and the blocks are removed (box 286). In the write state it is necessary to wait for the write operations of blocks at the start of the cache to finish so the data is not lost (box 288) before deleting those blocks from the cache (box 290).

Turning back to FIG. 6, when the host 24 makes a file-open request to node 34, no access to the server (which may be node 34') is required, since the server does not keep track of the state of the files. An empty cache is created on node 34 (box 94), and a reply is sent to the host 24 as described above (box 96). The task then goes back to sleep (box 78).

When the host 24 makes a flush request, the client handler task running on node 34 waits for all the pending writes to finish (box 91) after which it sends a host reply (box 93).

When the host 24 makes a file-close request, the cache is flushed if necessary and the cache is removed (box 100) by the client handler task running on node 34. A host reply is then sent (box 98).

Figure 10A:
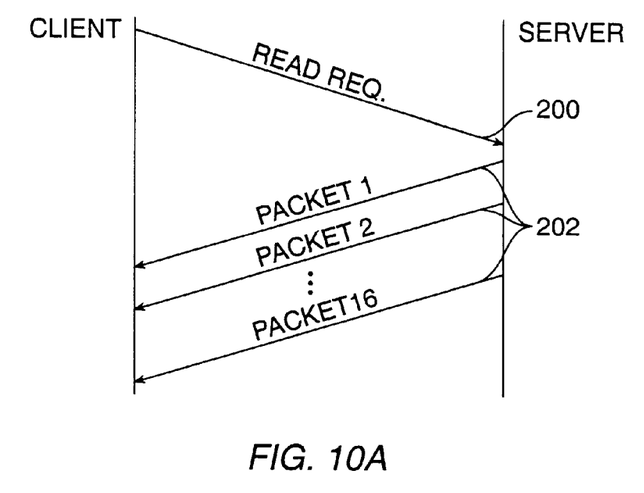
FIG. 10A is an illustration of a network read protocol that can be used to practice the present invention.

FIG. 10A illustrates the network protocol for a read transaction. The client (such as node 34) sends a read request packet 200 over the network 48 to the server (such as node 34'), in response to which the server sends the requested data in multiple packets 202 (sixteen packets in the preferred embodiment where the transactions handle one cache block at a time). If not all the data 202 is received by the client within a predetermined amount of time, the request 200 is resent.

Figure 10B:
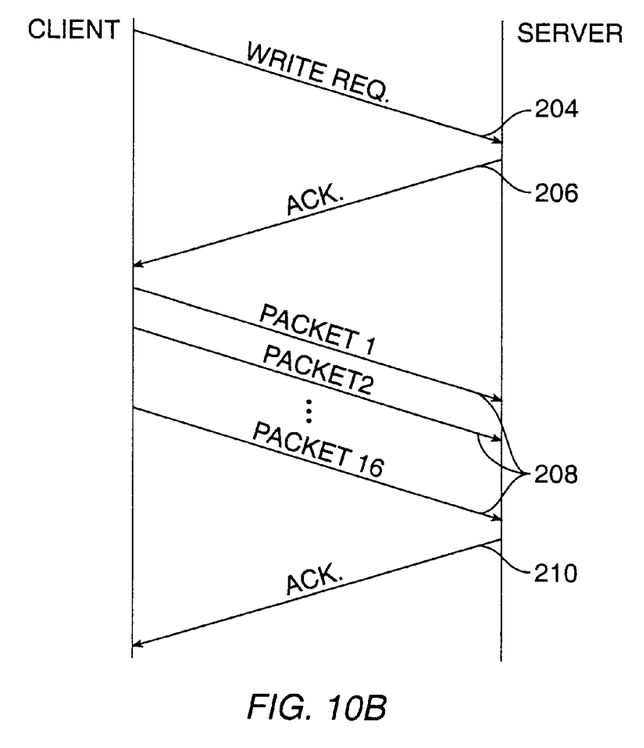
FIG. 10B is an illustration of a network write protocol that can be used to practice the present invention.

FIG. 10B illustrates the network protocol for a write transaction. First, the client (such as node 34) sends a write request packet 204 over the network 48 to the server (such as node 34'), in response to which the server sends a request acknowledgement packet 206 back to the client indicating that the write transaction may proceed. The client then sends the data in packets 208 (sixteen in the preferred embodiment). When all of the data is received, the server sends a data acknowledgement packet 210 to the client. If the server does not receive all of the data packets 208 within a predetermined time, it discards the data received and does not send a data acknowledgement packet 210. If the client does not receive either of the acknowledgement packets 206 or 210 within a predetermined time, it restarts the transaction of FIG. 10B.

Figure 11:
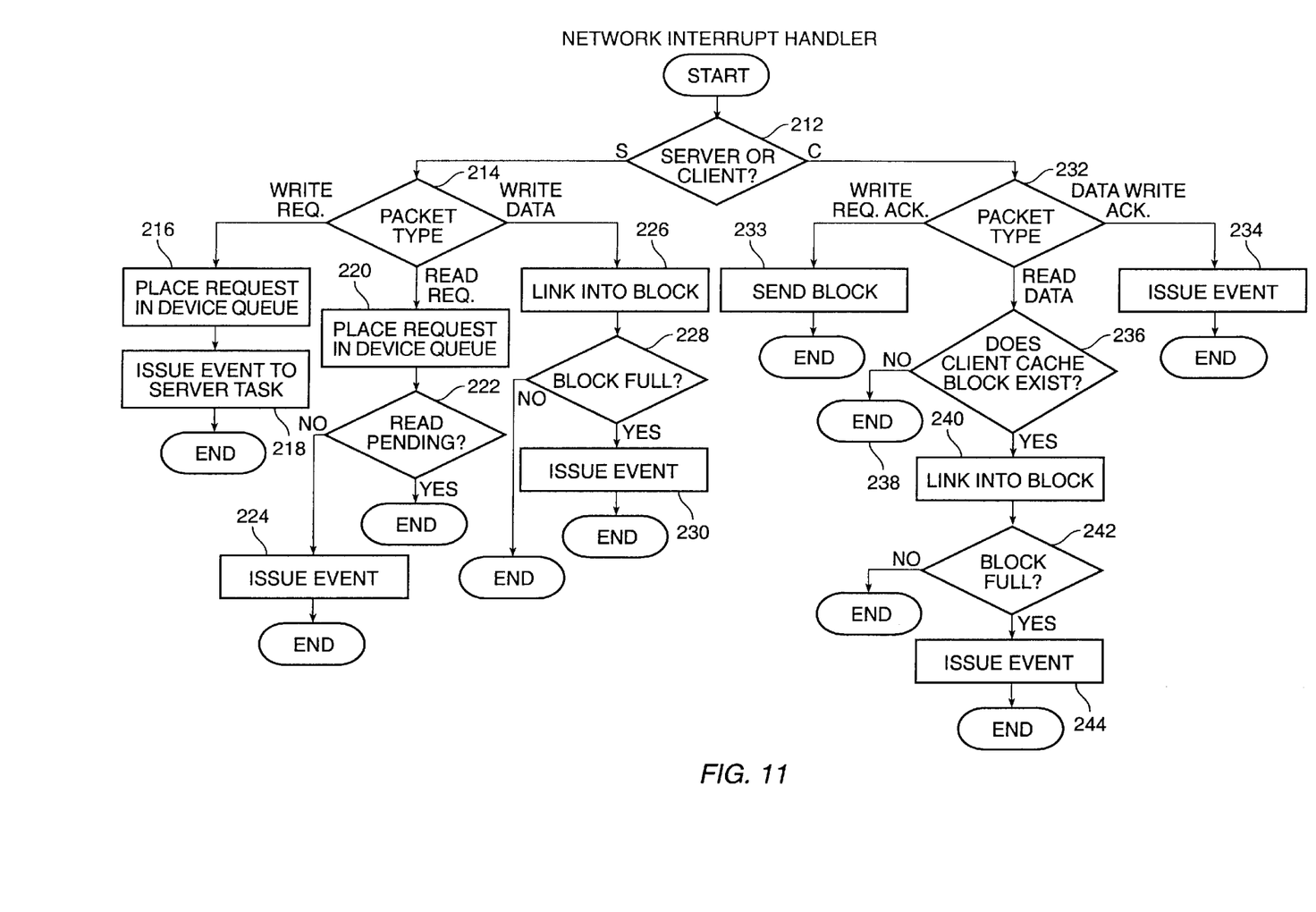
FIG. 11 is a flow chart of a network interrupt handler that can be used to practice the present invention.

The operation of the network interrupt handler running on each node is illustrated by the flow chart of FIG. 11. First, the packets received by network interface 38 are examined to determine whether they are for the server or the client functions of the node (box 212), and to determine the request type (boxes 214 and 232).

Write requests for the server are placed in the request queue for the appropriate device (box 216) and then an event is issued to the server task at the head of the server task queue (box 218). Read requests for the server are placed in the request queue for the appropriate device (box 220) but an event is issued (box 224) only if there is no read pending on the device (box 222) as explained below.

Write data for the server is assembled into a cache block (box 226). If the block is filled by this process (box 228) an event is issued to the server task (box 188 of FIG. 9) waiting for the write data (box 230).

On the client side, the packets are determined to be (box 232) write request acknowledgements (206 of FIG. 10B), write data acknowledgements 210, or read request data 202. If a write data acknowledgement 210 is received, an event is issued to the client handler task (box 234). If the packet consists of read data, it is assembled into a cache block (box 240) if one exists (determined at box 236). If no cache block exists, the handler ends (box 238). If the block is not full (box 242) no event is issued. Otherwise an event is issued to the client handler task (box 244). If a write request acknowledgement 206 is received, the corresponding block is sent (box 233) as a series packets 208.

It should be noted that the network interrupt handler also handles timeouts for read and write network transactions on the client side. This is not described to simplify the discussion, although the implementation will be apparent to those skilled in the art.

Figure 7:
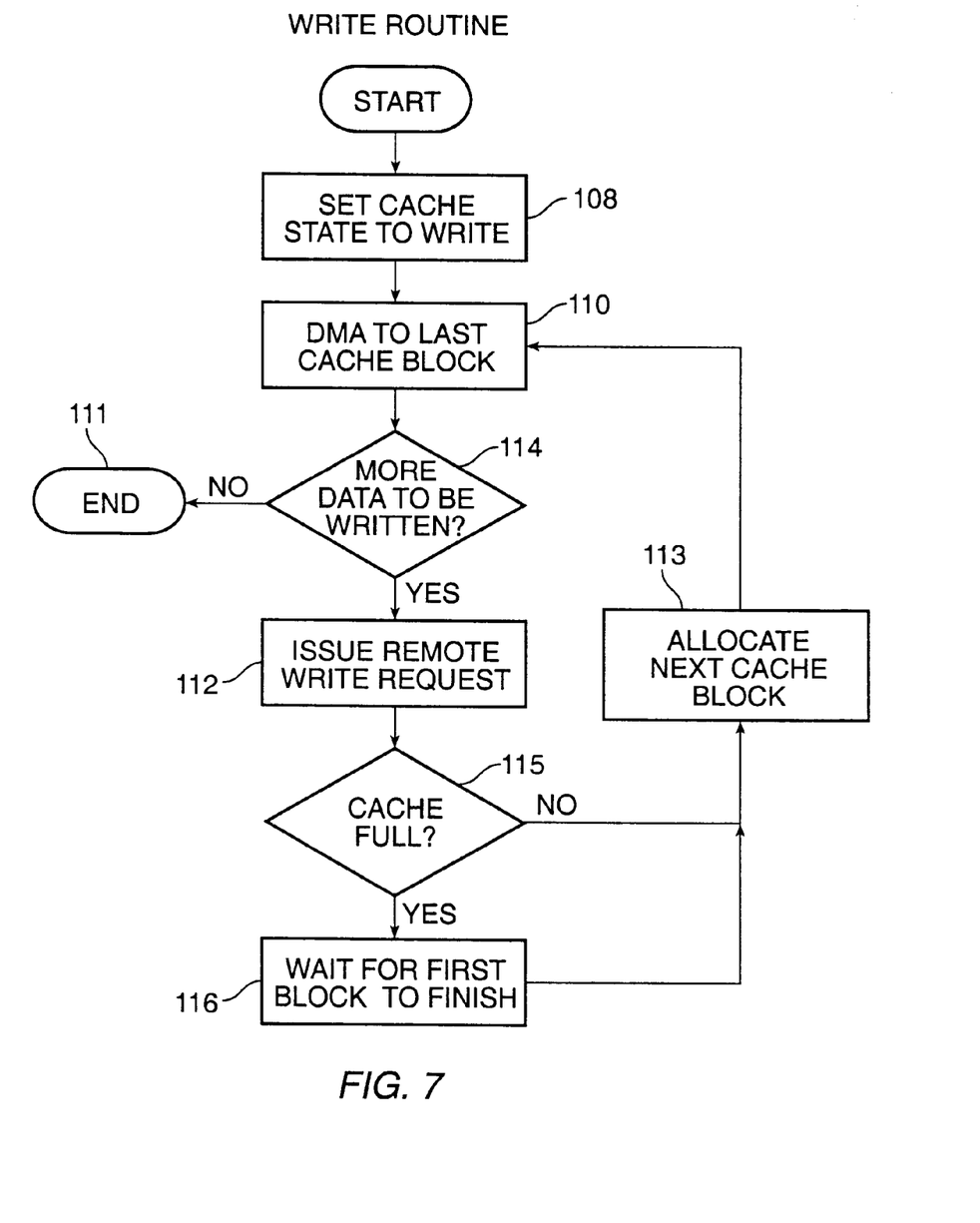
FIG. 7 is a flow chart of the write routine of the client handler task of FIG. 6.

The host write request from host 24 is handled by the client handler task running on node 34 as shown in the flow chart of FIG. 7 using the network protocol of FIG. 10B. First, the client cache on node 34 is flushed and set to the write state (box 108) possibly waiting for completion of pending block writes from a prior write request or discarding blocks previously read ahead. If the write begins in the middle of a block not yet in the cache, the block must also be read from the server, which may be node 34'. A block of data to be written is transferred by the DMA 42 from the host 24 to the node RAM 40 and linked into the cache (box 110). Write request packet 204 (FIG. 10B) is then sent to the server 34' (box 112). If there is no more write data to be copied from the host 24 into the cache on node 34 (box 114), the write routine is finished (box 111) because the pending write transactions are handled by the network interrupt handler running on node 34, and the last block to arrive from host 24 is not sent to the server. If there is more data to be written, a write request is issued for the last cache block (box 112). If the cache is full (determined at box 115), the task goes to sleep (box 116) while waiting for the completion of the writing of the first existing cache block, which is handled by the network interrupt handler. When the client handler task running on client node 34 wakes up by receiving an event from the network interrupt handler, there is room for copying additional data into the cache (boxes 113 and 110).

Figure 8:
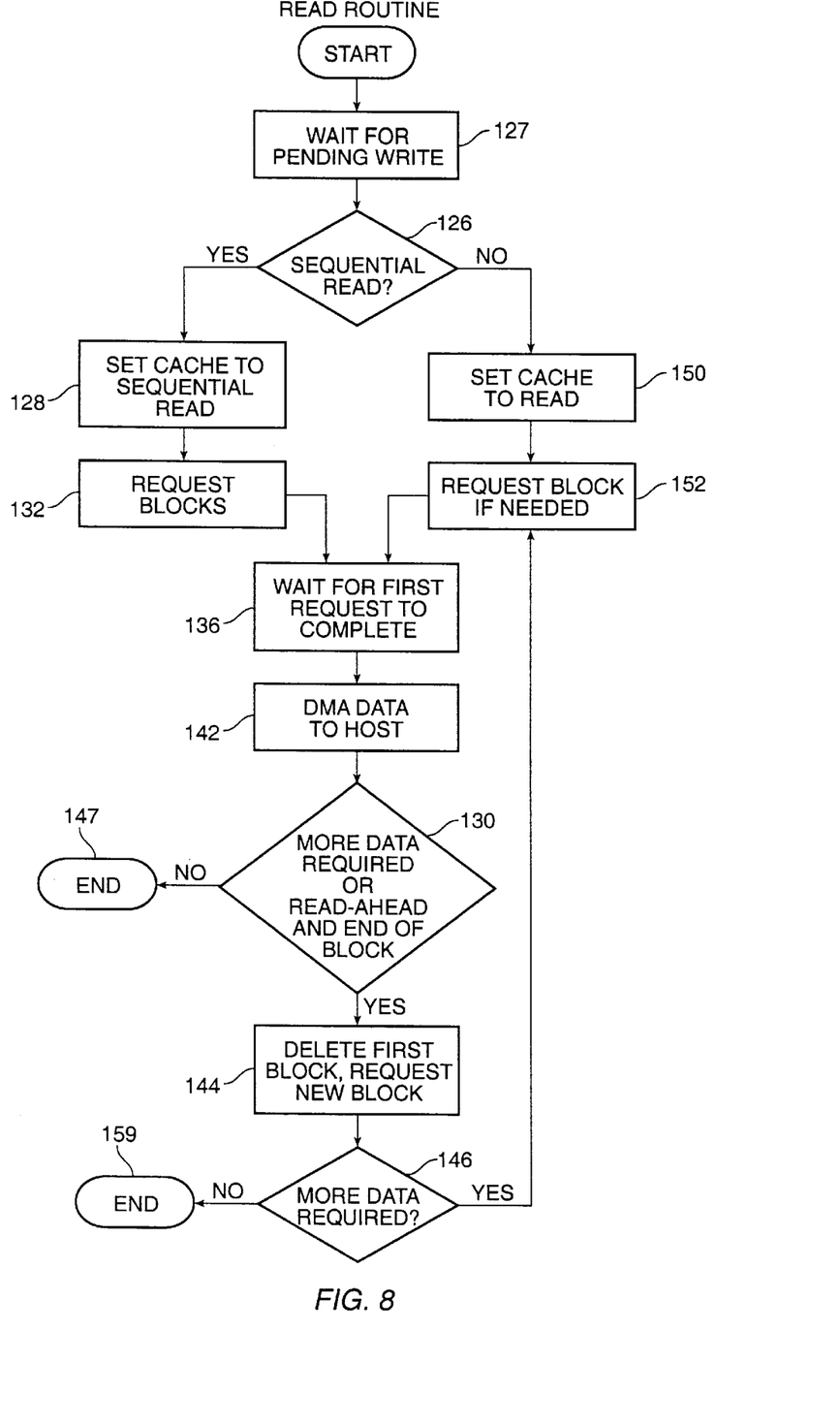
FIG. 8 is a flow chart of the read routine of the client handler task of FIG. 6.

The host read request is handled as shown in the flow chart of FIG. 8 using the network protocol diagram of FIG. 10A. First, the client handler task running on the client node flushes the cache and waits for any pending writes from the cache to complete (box 127). The read request and the prior status of the cache are examined to detect a possible sequential read (box 126). A sequential read is detected whenever at least 64 kB are to be read, when the data begins within a range already read into the cache, or when the cache was in the read state and more than 8 kB are to be read starting beyond the cache block.

If a sequential read is detected, the cache is set to sequential read status (box 128). The first block (if not already in the cache) and the appropriate number (as discussed above) of subsequent blocks are requested (box 132). If the block is not in the cache (box 134), the task waits for it to arrive (box 136). When the block arrives, it is transferred to the host (box 142). If the host request did not reach the end of the block and no more data is required (determined at box 130), the read routine is complete (box 147). Otherwise, the block is deleted and the next block not yet in the cache is requested (box 144). If the host is expecting more blocks (box 146) they are sought in the cache as described above (the operations beginning with box 136). Otherwise, the read operation is complete (box 159).

If the read is not sequential, the cache is set to read (box 150). If there is a cache hit, no data is requested from the server. A cache hit occurs when the data is found already in the cache. If there is a cache miss, the block is requested from the server (box 152) by sending a read request packet 200 (FIG. 10A) and the task goes to sleep while waiting for the data (box 136). When the block is received, the task receives an event front the network interrupt handler, and the block is transferred to the host (box 142). The operation continues as described above for the case of read-ahead with the difference that it ends when no more data is required even if the host request reaches the end of the block at box 130.

A node (such as node 34) may have several storage devices (such as disks 32 or disks arrays) attached to it. Each storage device contains one or more "file systems" (a set of data structures on the disk that describe a set of directories and files). Each file system stores file data in "allocation units," i.e. physical sectors on disk that contain a contiguous range of bytes from a particular file. For each storage device attached to a node, the server software maintains a "data cache," i.e. a set of cache blocks, each of which has one or more memory buffers containing user file data. The unit or block of these caches may be smaller than the file system's allocation unit. In the preferred embodiment, the file system allocation unit is 256 kB for large files and 512 bytes for small files, and the data cache unit is 64 kB.

The server-side software maintains caches of file system indexing information (metadata) as well as data. Units of all these caches are stored in a global list in LRU (least-recently-used) order. The server-side software makes a soft reservation request for the entire buffer pool when the first device is detected, and cancels it when the last device is removed. When the soft reservation is decreased, or when the cache is full and new elements must be read from disk, the system "purges" entries from the global cache. Purges are accomplished by writing the entries to disk if dirty, and removing them from the cache.

Figure 9:
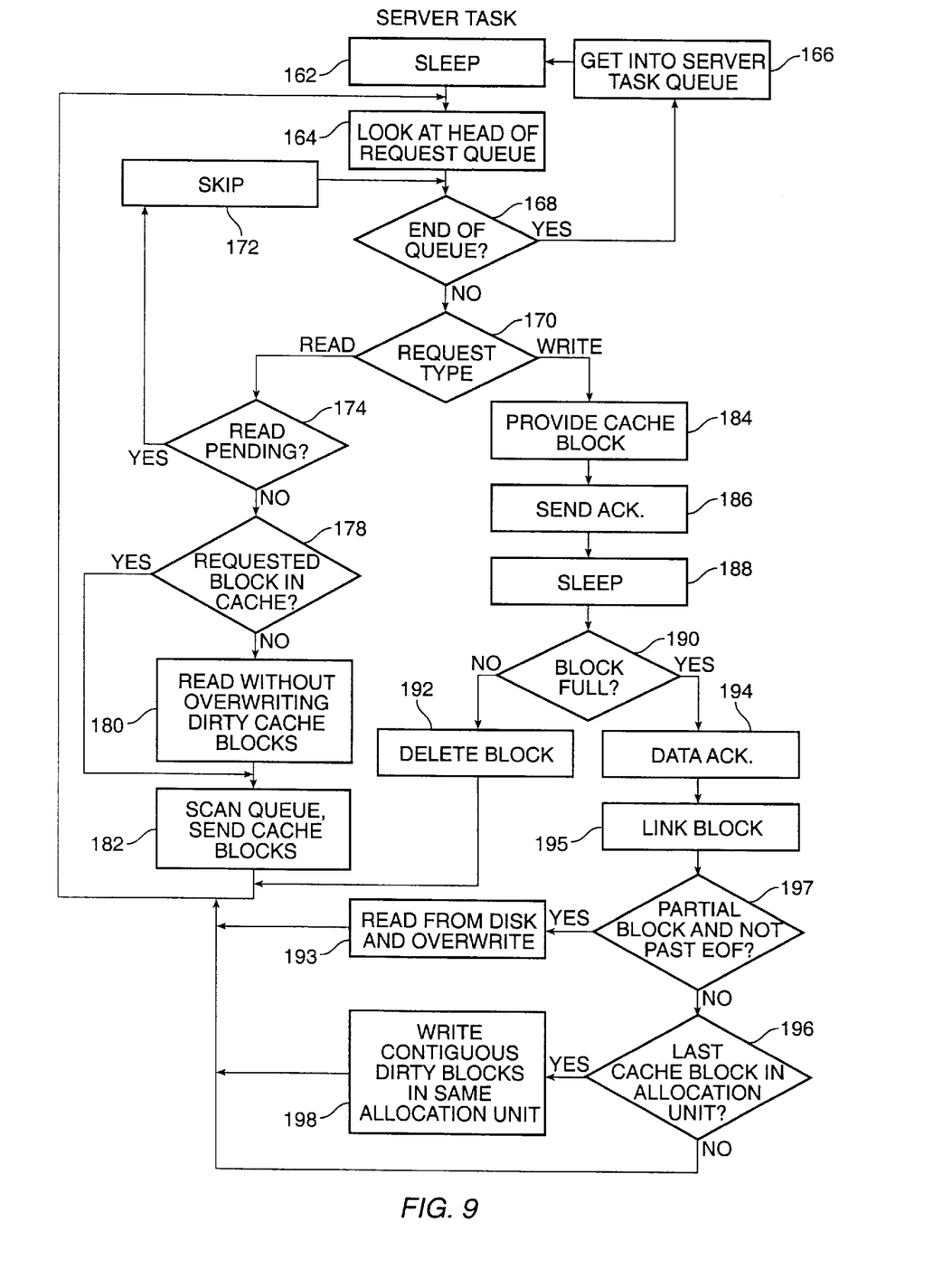
FIG. 9 is a flow chart of a server task according to the present invention.

On the server side, each device is handled by multiple server tasks running on the node (for example two), according to the flow chart of FIG. 9. In the absence of remote requests, the server tasks are placed into a queue (box 166) and go to sleep (box 162). A server task wakes up when the network interrupt handler of the node, described above, issues an event. The network interrupt handler maintains a separate queue of requests for each device and the server task begins to scan the queue (box 164). If the server task reaches the end of the request queue as determined at box 168, it gets placed in the server queue (box 164) and goes to sleep (box 162). Otherwise, the request is examined to determine whether it is a read or a write (box 170). In order to optimize the disk accesses, read requests are not served when there is another read pending, in which case (determined at box 174) the read request is skipped (box 172). This policy ensures that when the disk read operation completes, at least one server task will be immediately available to handle the next operation, thereby maximizing the overlap of disk I/O and network utilization. If a read is not pending, the device checks whether the requested block is already in the data cache (box 178), and if so goes to box 182. Otherwise, it transfers into the cache from the disk the cache block and possibly several subsequent blocks of the same file in the same allocation unit, without overwriting dirty cache blocks, in a single disk I/O request (box 180). The number of additional blocks read is limited to the lesser of the size of the file, the range of blocks not already in the cache, and the amount of cache space available.

At the completion of the disk read operation, the server task scans the request queue for additional requests for blocks in the range it read from the disk. It removes all such requests from the queue, removes the corresponding blocks from the data cache, and replies to the requests over network 48 (box 182).

If the request is determined to be a write request at step 170, the server task running on the server node provides a cache block for the data (box 184) and sends a request acknowledgement packet 206 (FIG. 10B) to the client over network 48, after which it goes to sleep while waiting for the write data (box 188). When it wakes up, it determines whether enough data has been written to the block to fill the cache block (box 190) or a timeout occurred, in which case the block will not be full. A timeout occurs when a particular operation has not completed in a predetermined amount of time. In case of a timeout, the block is deleted (box 192). If the block is full, a data acknowledgement 210 (FIG. 10B) is sent to the client (box 194) and the block is linked in the corresponding data cache (box 195). If the block is only partially written and not past end of file (EOF) as determined at box 197, the block is first read from disk, and then modified according to the received data (box 199). If the block is the last block of a disk allocation unit (as determined at box 196), the task checks the data cache for the range of blocks that are dirty, and are contiguous with the new one and in the same allocation unit. It then writes these blocks to disk in a single disk I/O request (box 198). Remaining dirty blocks are written when the cache is periodically flushed by the custodian task as discussed below or purged as discussed above.

Figure 12:
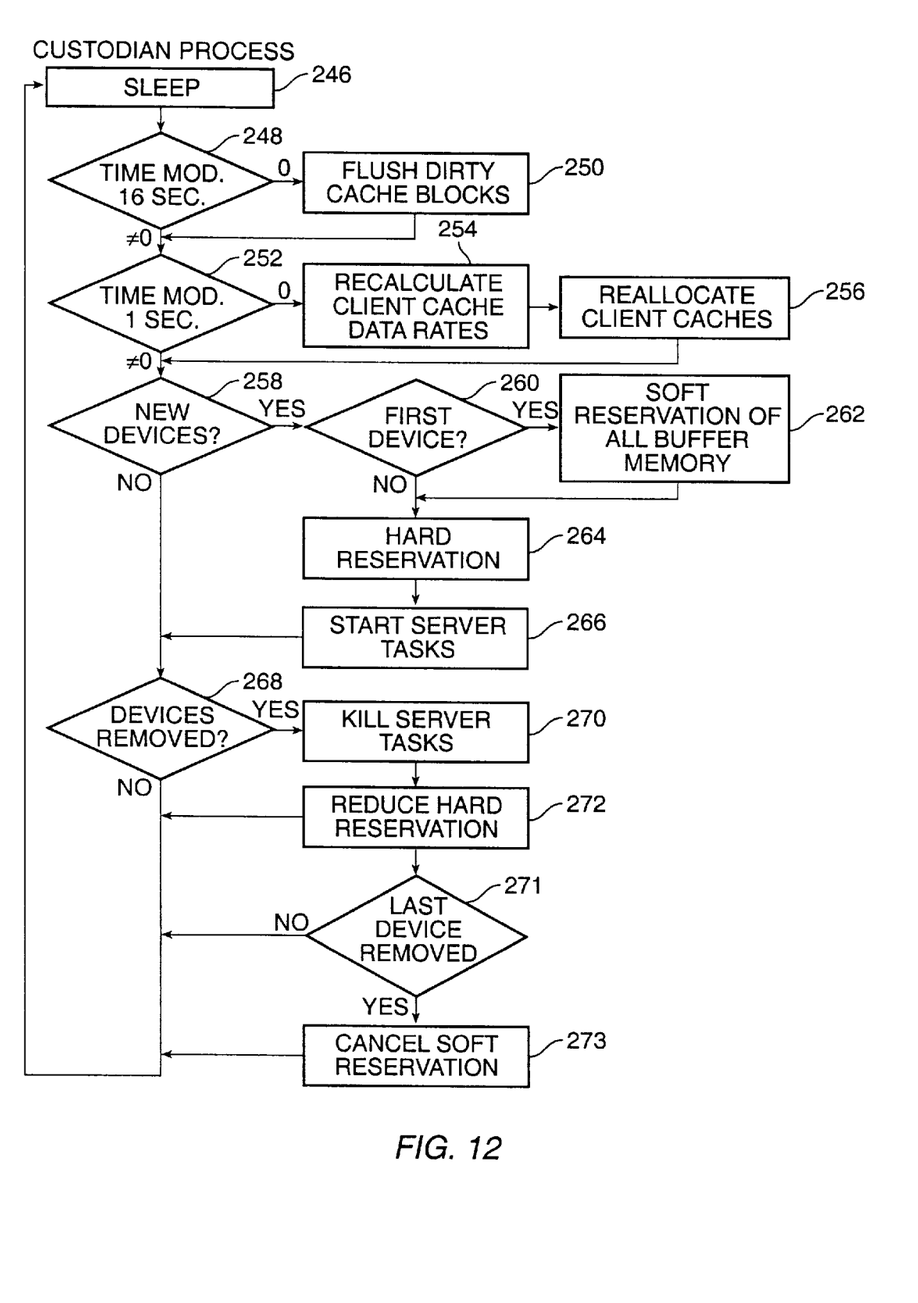
FIG. 12 is a flow chart of a custodian process that can be used to practice the present invention.

The operation of the custodian process running on each node is illustrated with the flow chart of FIG. 12. This process usually sleeps (box 246) and executes at regular time intervals. Every 16 seconds (as determined at box 248), the dirty cache blocks in the server cache are flushed (box 250). Every second (as determined at box 252), the client cache data rates are recalculated (box 254), and the client caches are reallocated (box 256 and FIG. 13).

The custodian task then checks whether new devices have been added to the node (box 258). When the first device on the node is detected (box 260), a soft reservation for the entire buffer pool is made (box 262). Wherever a new device is detected, a hard reservation is made in an amount sufficient for device metadata and for three cache blocks for use by the cache and the server tasks (box 264), and server tasks are started (box 266).

If devices are removed (box 268), the server tasks are killed (box 270) and the hard reservation is reduced (box 272). When the last device is removed (box 271), the soft reservation for the server is canceled (box 273). The custodian process then goes back to sleep (box 246).

Source code in C++ for an implementation of the node software is included in the appendix. The source code is included by way of specific illustrative example only, and those skilled in the art will recognize that other and different code could be written to implement the claimed invention.

In summary, an apparatus and method for high speed file access with a distributed file server has been described. In the case of the Apple Macintosh, the present invention allows a 2–3 times higher network throughput than is currently available.

The present invention has been described in terms of a preferred embodiment. The invention, however, is not limited to the embodiment depicted and described. Rather, the scope of the invention is defined by the appended claims.

What is claimed is:

1. In a distributed file system including high speed random access general purpose memory within a network node coupled to a host computer and a plurality of mass storage devices interconnected via a network for storing data files in disparate locations, a method for caching data files from said mass storage devices using a limited amount of said general purpose memory, said method comprising the steps of:

providing at least one cache area in said general purpose memory for each accessed file;

evaluating a data flow rate over network data paths and direct data paths associated with said each accessed file through said at least one cache area ("__file data flow rate__"); and allocating, by means of a processor within said network node, a portion of said general purpose memory to said at least one cache area in an amount proportional to said associated file data flow rate.

2. The method according to claim 1 for caching data in response to instructions for performing read operations by a client device from a network file server, said network file server defining file structures on selected ones of said at least one mass storage device, said method comprising the steps of:

provoding, on said network file server, a first cache area of said at least one cache area for caching first data from said at least one mass storage device;

providing, on said network file server, a second cache area of said at least one cache area for caching second data which is to be read by an application program from said at least one mass storage device, said second data being stored on said network file server; and reading ahead into the second server cache area enough data to keep operations involving the first server cache area at least one mass storage device access interval ahead of operations involving data currently being read by said application.

3. The method according to claim 1 further including the step for organizing said general purpose memory, said step of organizing comprising the substeps of:

establishing a plurality of units of said general purpose memory of equal size;

assigning each of said units to one of a plurality of sets of the units, said sets being defined for mass storage device cache areas and for I/O device buffers, the order of the units of each set being independent of the order and distribution of the units in said general purpose memory;

maintaining a data structure of remaining unassigned units, the data structure being independent of the order of the remaining unused units in said general purpose memory;

using said sets of units as said cache areas for said mass storage devices and for said I/O device buffers; and changing assignment of at least one of said units from a first one of said sets to a second one of said sets.

4. The method according to claim 1 further including the step for organizing said memory, said step for organizing said memory comprising the substeps of:

specifying a first minimum amount and a first maximum amount of said general purpose memory to be reserved for a first one of a plurality of activities;

if a sum of minimum amounts of said general purpose memory to be reserved by all said activities is less than a total amount of said general purpose memory available for said activities, reserving for a first one of said activities an actual amount of said general purpose memory between said first minimum amount and said first maximum amount; and if said general purpose memory has been reserved for said first one of said activities, and thereafter if a second one of said activities requests a change in a second minimum amount and a second maximum amount of said general purpose memory to be reserved for said second one of said activities, adjusting said actual amount of said general purpose memory reserved for said first one of said activities and for said second one of said activities between said first and second minimum amounts and said first and second maximum amounts such that a sum of all actual reservations is less than or equal to total available amount of said general purpose memory.

5. The method according to claim 1 further including the step of: caching, responsive to a first read request, a first block of file data from a local mass storage device which is one of said at least one mass storage devices into a first cache area associated with said accessed file, said caching comprising the sub-steps of:

determining whether said first read request is part of a sequential pattern of read requests;

if said first read request is part of a sequential pattern of read requests and said first block of file data is not in said first cache area of said general purpose cache memory, reading a range of blocks beginning with said first block of file data into said first cache area from said local mass storage device;

if said first read request is part of a sequential pattern of read requests and said first block of file data is in said first cache area, verifying that said range of blocks beginning with said first block of file data is in said first cache area; and if said first read request is part of a sequential pattern of read requests, said first block of file data is in said first cache area and said range of blocks beginning with said first block of file data is not in said first cache area, reading those blocks of said range which were not in said first cache area into said first cache area from said local mass storage device.

* * * * *